Oct. 21, 1952 — C. B. MERRY — 2,614,474
WALKING CULTIVATOR
Filed April 25, 1949 — 2 SHEETS—SHEET 2

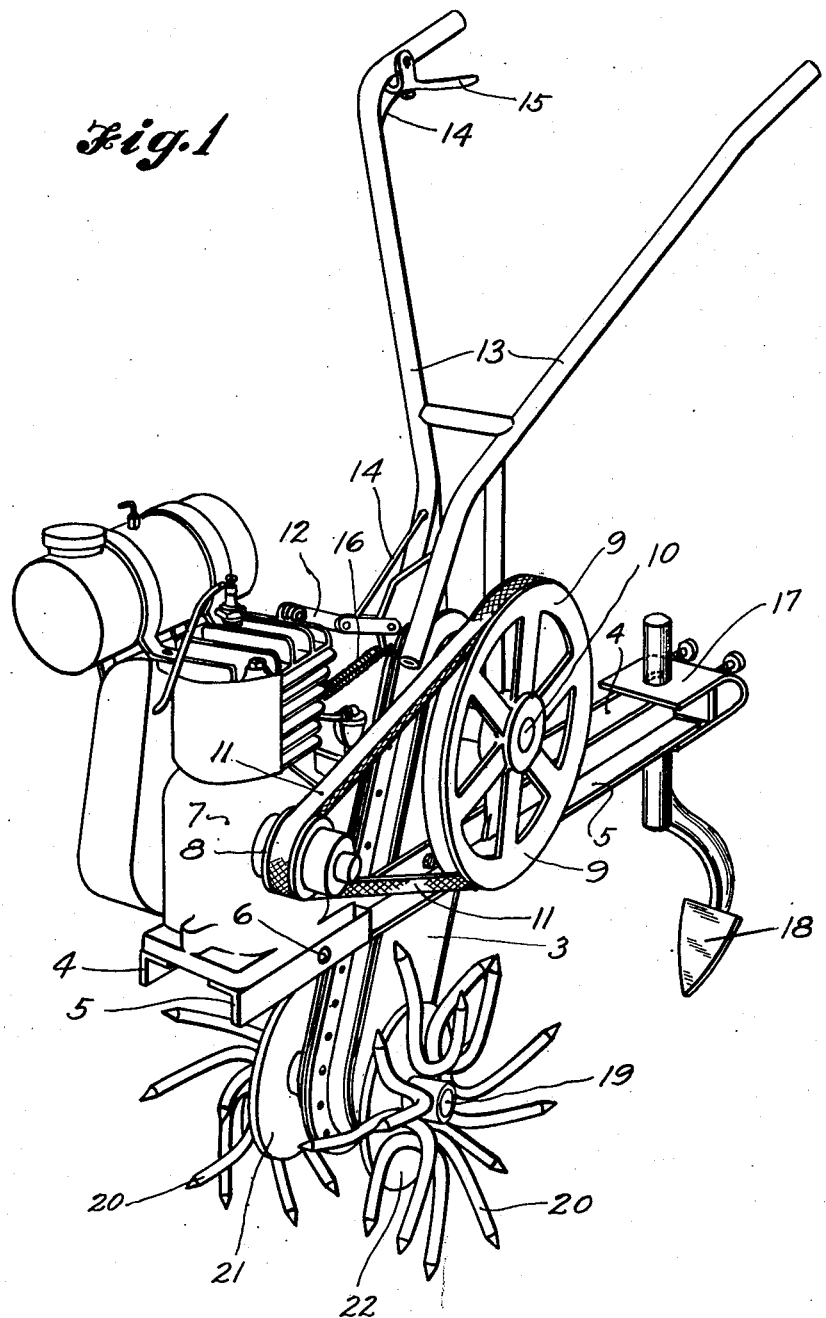

Inventor
Clayton B. Merry
Paul Bliven
Attorney

Patented Oct. 21, 1952

2,614,474

UNITED STATES PATENT OFFICE 2,614,474

WALKING CULTIVATOR

Clayton B. Merry, Alderwood Manor, Wash.

Application April 25, 1949, Serial No. 89,421

10 Claims. (Cl. 97—40)

The present invention relates to a walking cultivator supported on powered earthworking wheels suspended below the frame proper and serving to propel the machine as well as break the ground. More particularly, the cultivator utilizes a brake tooth in conjunction with the earthworking wheels which can be readily urged into the ground by the operator to create a braking force for controlling the proportions of the power for any given throttle setting operating to perform the tilling and tractive functions of the earthworking wheels. This application is a continuation-in-part of my abandoned application, Ser. No. 692,595, filed August 23, 1946.

Various walking cultivators have appeared on the market which utilized earthworking wheels to forwardly propel the machine while they were performing their ground breaking functions, but these cultivators were extremely heavy and difficult to maneuver. Much of their weight was supported either on auxiliary wheels or by the operator, the former being objectionable because the auxiliary wheels often sank in soft ground and otherwise created a drag making the machine more difficult to handle and causing waste of power, and the latter perforce having the objection that it unduly burdened the operator. Furthermore, these prior cultivators had a natural tendency to race over hard ground without performing their tilling function, and this tendency was often aggravated by the fact that much of the weight of the machines was not bearing down on the earthworking wheels. When this racing action occurred the operator would cut down the throttle setting of the power unit to slow down the cultivator, and as a result the power would be reduced at the very time when it was most needed to break up the ground.

With these and other failings of the prior art in mind the present invention aims to provide a readily maneuverable and highly efficient walking cultivator of light weight which can be controlled at will to till at various depths without the use of auxiliary support.

A further aim of the invention is to provide such a cultivator which can dig to a depth far exceeding the radius of its earthworking wheels.

Other more and particular objects and advantages will with the foregoing, appear and be understood in the course of the following description and claims, the invention consisting in the novel construction and combination of parts hereinafter described and claimed.

In the drawings:

Figure 1 is a perspective view of my walking powered cultivator.

Figures 2, 3:
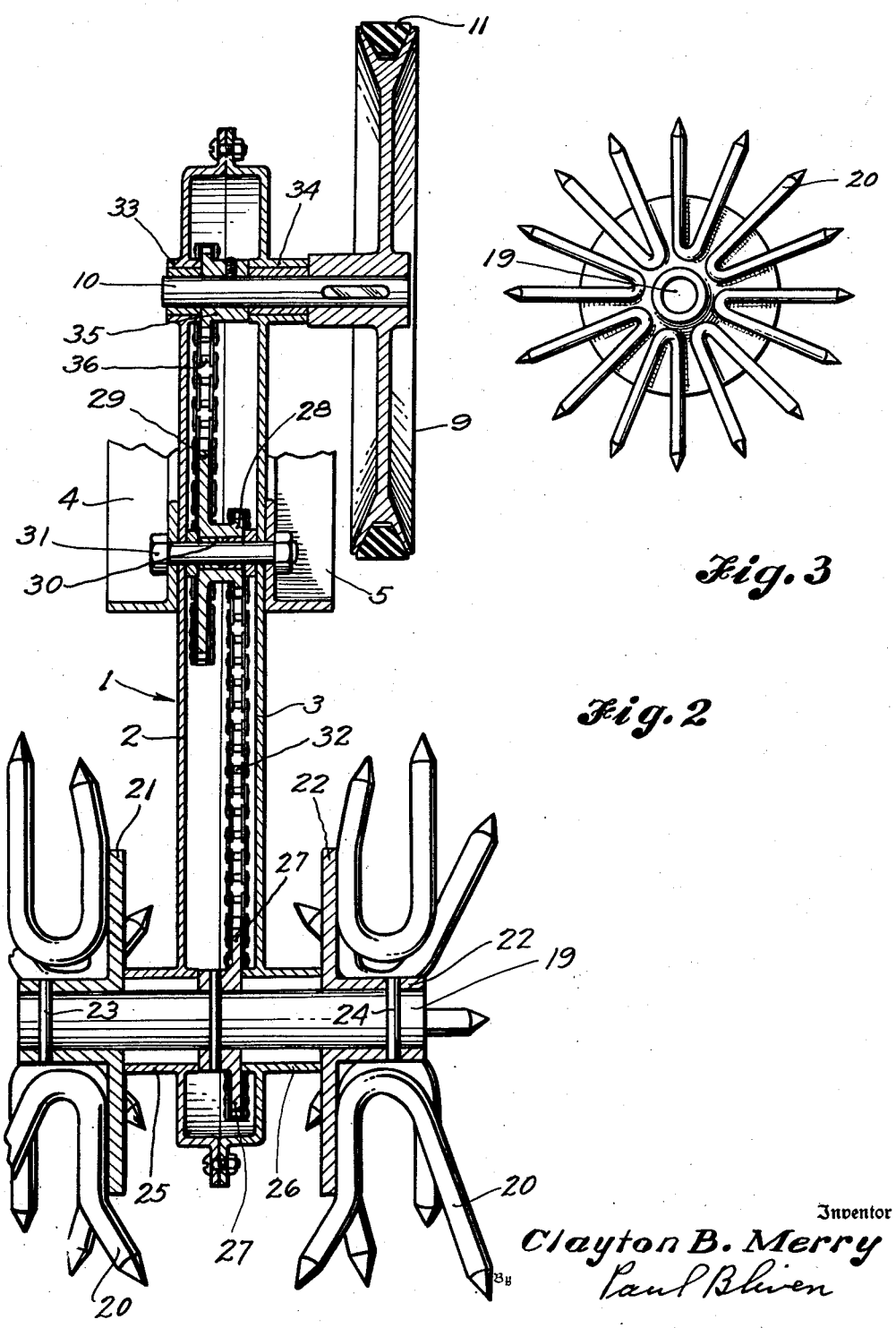
Figure 2 is a sectional view thru the sprocket centers of the transmission of the device shown in Figure 1.
Figure 3 is a side view of one of the rotary earthworking elements.

In Figure 1, the perspective view of my new cultivator, there is shown the transmission housing 1 which is made up of the two case halves 2, 3 each peripherally flanged and shallow-dished with the flanges being bolted together. Mounted on and forward of this case by means of the two angle irons 4, 5 and the motor pivot 6 is the motor 7. The motor 7 is a standard air cooled four cycle gasoline engine of about one and one-half horse power. The drive pulley 8 of the motor is V-belted to a driver pulley 9 mounted on a shaft 10 journalled in the upper part of the housing 1. The V-belt 11 is used not only for the transmission of power but, also, as a clutch by pivoting the motor base on the pivot 6. Control of the motor swing is had by the toggle link 12. This toggle link has one end secured to the motor head and the other end secured to the handles 13. A cable control 14 extends between the toggle link and a hand lever 15 mounted on the grip portion of one of the handles. Tension is placed across the toggle link by the spring 16. This spring pulls the motor toward the handles to declutch the motor when tension on the cable 14 is released. The handles 13 are of welded tubular construction and are bolted to the housing thru the flanges thereof. Secured to the rearward ends of the angle irons 4, 5 is a hitch 17 in which there may be demountably fastened a brake tooth 18 having a flat front face sloping forwardly somewhat and shaped so as to be easily urged into the ground.

As shown in Figure 2, there are suitable mechanisms in the case 1 to transmit power from the drive pulley 9 mounted on the drive shaft 10 in the upper part of the housing to the driven shaft 19 mounted in the lower part of the housing 1 and extending thru, transversely of, and beyond each side of the housing. Radially extending ground engaging tines 20 are mounted circumferentially of and longitudinally of the outer portions of the shaft and on each side of the housing. These tines are made of a series of round bars each bent into a U-shaped unit and preferably pointed somewhat. One leg of each unit is welded to the flange of a flanged hub 21, 22. One of these assemblies, or hubs, is placed on each end of the driven shaft 19. The hubs 21, 22 are fastened to the driven shaft 19 by means of pins 23, 24 extending thru each hub and the shaft. The shape of each U-shaped unit may be varied from the others on the hub so that the tines do not track one behind the other, but in effect cover the whole width of the cultivator. In the illustrated embodiment, as best shown in Fig. 2, two shapes of U-shaped units are utilized, one having diverging tines and the other having its tines converging slightly. It will be noted that each of the welded diverging tines is bent so that its point tracks between the respective hub flange and the housing, and that the other diverging tines track laterally beyond the outer ends of the hubs and the shaft 19. The lower end of each case half 2, 3 carries a boss 25, 26 in which are arranged suitable bearings and oil seals for the driven shaft 19.

Secured to and medially of the driven shaft 19 is a driven shaft sprocket 27. Medially of the housing 1 is an intermediate cone sprocket having a smaller sprocket 28 and a larger sprocket 29 secured together to form the cone sprocket. The cone sprocket turns on a sleeve 30. Washers space the ends of the sleeve from the case halves and take the end thrust of the cone sprocket. The washers and sleeve 30 are carried on a bolt 31 that passes thru the case halves and a flange of each of the motor support angles 4, 5. The bolt is tightened so that the housing halves 2, 3, washers and sleeve 30 are clamped together to prevent movement or turning of the sleeve and washers. A chain 32 is placed around and between the intermediate smaller sprocket 28 and the driven sprocket 27. An upper bearing boss 33, 34 is secured to each case half 2, 3 near its upper end. The drive shaft 10 is journaled in these upper bearing bosses. Outboard of the drive shaft 10 is the driven pulley 9. Inboard of the drive shaft 10 is a drive sprocket 35 which is secured to the drive shaft 10. A chain 36 is placed around and between the drive sprocket 35 and the larger intermediate sprocket 29.

The operation of the power transmission train is to obtain a speed reduction at each step from the motor, that is, from the motor drive pulley 8 to the driven pulley 9, from the drive sprocket 35 to the intermediate larger sprocket 29, from the intermediate smaller sprocket 28 to the driven sprocket 27. With a motor operating at about 2,400 R. P. M., the value of the train is best at about one to thirty. With a diameter of about ten inches for the assembly of the ground engaging tines 20, the cultivator operates at a convenient walking speed.

For any given throttle setting the operator can control the amount of tillage performed by the rotating tines 20 by controlling the depth of the brake tooth 18 in the ground through downward pressure on the handles. If the earth is particularly hard or rocky the forward progress of the machine can be stopped altogether by the brake tooth in which case the tines will dig until the hubs are actually well beneath the ground level. This is possible because the housing 1 has a particularly narrow lateral width and the flanges of the hubs 21 are thin with both the housing and the hubs having some of the tines working closely on both sides thereof. Of some importance also in this regard is the fact that the tines project laterally beyond the ends of the shaft 19 and the hubs 21, 22 thus assuring that the shaft and the hubs will not interfere with downward progress of the tines.

The cultivator is also particularly effective because the motor is so spaced forwardly of the rotary axis of the earthworking tines as to balance the weight of the cultivator structure to the rear thereof. As a result the center of gravity of the cultivator overlies the rotary axis so that the tines have the full benefit of the weight of the cultivator. At the same time this arrangement eliminates the need of any additional support either by wheels or by the operator, and leaves the operator free to steer the device and control its tilling action by varying the depth of the brake tooth in the ground.

From the foregoing description it will appear obvious that the cultivator is much lighter in weight than its predecessors in the art because of its novel frame construction, light-weight earthworking wheels, and smaller motor, and yet by the maximum use of its weight, the utilization of the brake tooth, and the lack of interference with the action of the tines, more effective and deeper tillage is accomplished with far less expenditure of horsepower.

If desired, conventional drag-type earthworking implements may be fastened in the hitch 17 instead of the brake tooth 18. In such a case the rotary tined hubs 21, 22 serve as traction wheels, or if desired, these hubs can be replaced by other rotary tractive devices.

It is thought that the invention and the manner of operation will be clear from the foregoing detailed description of the now preferred embodiment. Changes in the details of construction may be resorted to without departing from the spirit of the invention and it is accordingly my intention that no limitations be implied and that the hereto annexed claims be read with the broadest interpretation to which the employed language fairly admits.

Having thus set forth my invention, I claim:

1. A walking cultivator comprising a frame providing a laterally spaced pair of longitudinal frame members, a drive housing secured between the frame members and extending above and depending below said members, laterally extending shafts journal-mounted in the upper and lower ends of the drive housing, a power unit mounted on said frame members forwardly of the drive housing, means for transferring power from the power unit to the upper said shaft, and means in the drive housing for transferring power from the upper shaft to the lower shaft, axially aligned earthworking wheels driven by the lower shaft at opposite sides of the drive housing and each adapted to perform both tractive and tilling functions, the depending portion of said drive housing have a narrow width between its lateral faces.

2. A walking cultivator comprising a frame providing a laterally spaced pair of longitudinal frame members, a drive housing secured between the frame members and extending above and depending below said members, laterally extending shafts journal-mounted in the upper and lower ends of the drive housing, a power unit mounted on said frame members forwardly of the drive housing, reduction-drive means for transferring power at a reduced speed from the power unit to the upper said shaft, reduction-drive means in the drive housing for carrying the power from the upper to the lower of said shafts at a further reduced speed, and axially aligned earthworking wheels driven by the lower shaft at opposite sides of the drive housing and each adapted to perform both tractive and tilling functions, the depending portion of said drive housing having a narrow width between its lateral faces and sufficient length to provide a generous clearance between the wheels and the frame members.

3. The structure of claim 2 in which the second said reduction-drive means includes a stepped cone sprocket journaled in the drive housing between the longitudinal frame members and in which there is provided for said sprocket a journal mounting receiving its support directly from said members.

4. A walking cultivator comprising a frame providing a laterally spaced pair of longitudinal frame members having flat inside opposed faces, a flat-sided narrow drive housing secured with its flat sides between and in abutment with said flat faces of the frame members and projecting by its upper and lower ends above and below said members, a power unit mounted on said frame members forwardly of the drive housing, laterally extending upper and lower shafts journal-mounted in the upper and lower ends of the drive housing, means for transferring power from the power unit to the upper shaft, means in the drive housing for transferring power from the upper to the lower shaft, and earthworking wheels driven by the lower shaft and carried thereby to occupy portions at opposite sides of the drive housing.

5. A walking cultivator comprising a frame providing a laterally spaced pair of longitudinal frame members having flat inside opposed faces, a flat-sided narrow drive housing secured with its flat sides between and in abutment with said flat faces of the frame members and projecting by its upper and lower ends above and below said members, said drive housing comprising a mating pair of peripherally flanged and shallow-dished shells having their flanges secured together, a pair of rearwardly extending control handles each having a forked root end with one of its fork branches being connected to a respective frame member and the other fork branch being secured to an upper end portion of the peripherial flange of the respective said housing shell, a power unit mounted on the frame members forwardly of the drive housing, laterally extending upper and lower shafts journal-mounted in the upper and lower ends of the drive housing, means for transferring power from the power unit to the upper shaft, means in the drive housing for transferring power from the upper to the lower shaft, and earthworking wheels driven by the lower shaft and carried thereby to occupy positions at opposite sides of the drive housing.

6. A walking cultivator comprising a frame providing a laterally spaced pair of longitudinal frame members having flat inside opposed faces, a flat-sided narrow drive housing located with its flat sides between and in abutment with said flat faces of the frame members and with its ends extending above and depending below said members, means for holding the frame members and the drive housing together and including a tie-bolt passing through the members and housing, a power unit mounted on said frame members forwardly of the drive housing, laterally extending upper and lower shafts journal-mounted in the upper and lower ends of the drive housing, a stepped cone sprocket journal-mounted on said tie-bolt, means for transferring power from the power unit to the said upper shaft, means in the drive housing for transferring power at a reduced speed from the upper shaft to the larger sprocket of said cone sprocket, means in the drive housing for transferring power at a reduced speed from the smaller sprocket of said cone sprocket to the said lower shaft, and earthworking wheels driven by the lower shaft and carried thereby to occupy positions at opposite sides of the drive housing.

7. A walking cultivator comprising a frame providing a laterally spaced pair of longitudinal frame members and a rearwardly extending control handle, a drive housing secured between the frame members and extending above and depending below said members, laterally extending shafts journal-mounted in the upper and lower ends of the drive housing, a motor mounted on said frame members forwardly of the drive housing, means for transferring power from the motor to the upper said shaft, means in the drive housing for transferring power from the upper shaft to the lower shaft, axially-aligned tined earthworking wheels driven by the lower shaft at opposite sides of the drive housing and each adapted to perform both tractive and tilling functions, and brake tooth means depending from the frame rearwardly of the said wheels and adapted to be urged into the ground to various depths by downward pressure exerted on the control handle while the cultivator is being steered to create a variable braking force whereby the power to the wheels is selectively apportioned between the said tractive and tilling functions thereof, said wheels and brake tooth means being arranged to provide the entire ground-engaging support for the cultivator.

8. A walking cultivator comprising: a frame assembly providing a forwardly positioned motor mount, a rearwardly positioned hitch, a control handle extending rearwardly of the hitch, and a transversely-centered flat-sided drive housing located between and extending higher and lower than both the hitch and motor mount; laterally extending shafts journal-mounted in the upper and lower ends of the drive housing; a motor carried by the motor mount; means for transferring power from the motor to the upper said shaft; means in the drive housing for transferring power from the upper shaft to the lower shaft; axially-aligned tined earthworking wheels driven by the lower shaft at opposite sides of the drive housing and each adapted to perform both tractive and tilling functions; and brake tooth means depending from the hitch and adapted to be urged into the ground to various depths by downward pressure exerted on the control handle while the cultivator is being steered to create a variable braking force whereby the power to the wheels is selectively apportioned between the said tractive and tilling functions thereof; said wheels and brake tooth means being arranged to provide the entire ground-engaging support for the cultivator.

9. A walking cultivator comprising; a frame assembly providing a motor mount, a rearwardly positioned hitch, a control handle extending rearwardly of the hitch, and a transversely-centered drive housing located forwardly of the hitch and extending lower than both the hitch and motor mount; upper and lower shafts journal-mounted in the upper and lower ends of the drive housing with the lower shaft extending laterally; a motor carried on the motor mount; drive means including a flexible drive for transferring power from the motor to the upper said shaft; a reduction drive in the drive housing for transferring power at a reduced speed from the upper to the lower shaft; axially-aligned tined earthworking wheels driven by the lower shaft at opposite sides of the drive housing and located lower than the motor mount, each said wheel being adapted to perform both tractive and tilling functions; and brake tooth means depending from the hitch and adapted to be urged into the ground to various depths by downward pressure exerted on the control handle while the cultivator is being steered to create a variable braking force whereby the power to the wheels is selectively apportioned between the said tractive and tilling functions thereof; said wheels and brake tooth means being arranged to provide the entire ground-engaging support for the cultivator.

10. A walking cultivator comprising a frame providing a transversely centered and longitudinally extending opening having its sides defined by flat opposed vertical faces, a flat-sided drive housing secured with its flat sides between and in abutment with said flat faces and projecting by its upper and lower ends above and below said faces, a power unit mounted on said frame, axially-aligned ground-engaging wheels journal-mounted at the lower end of the drive housing and positioned at the opposite sides thereof, and means for transferring power from the power unit to the upper end of the drive housing and from there down through the housing to the wheels.

CLAYTON B. MERRY.

REFERENCES CITED

The following references are of record in the file of this patent:

UNITED STATES PATENTS

| Number | Name | Date |
|---|---|---|
| 874,268 | Waterman | Dec. 17, 1907 |
| 1,046,921 | White | Dec. 10, 1912 |
| 1,416,993 | Stephens | May 23, 1922 |
| 1,744,597 | Vasconcellos | Jan. 21, 1930 |
| 1,751,694 | Glasier | Mar. 25, 1930 |
| 1,944,789 | Gravely | Jan. 23, 1934 |
| 2,176,261 | Kelsey | Oct. 17, 1939 |
| 2,211,260 | Donald | Aug. 13, 1940 |
| 2,250,391 | Ober | July 22, 1941 |
| 2,388,553 | Kraus | Nov. 6, 1945 |
| 2,491,892 | Claus | Dec. 20, 1949 |

FOREIGN PATENTS

| Number | Country | Date |
|---|---|---|
| 727,895 | Germany | Nov. 14, 1942 |
| 611,458 | Great Britain | Oct. 29, 1948 |